Oct. 18, 1955     E. D. BROWN     2,720,807
ADJUSTABLE PINCH DOG
Filed March 25, 1954

Earl D. Brown
INVENTOR.

BY *Clarence A. O'Brien*
*and Harvey B. Jackson*
Attorneys

_2,720,807_

ADJUSTABLE PINCH DOG

Earl D. Brown, Williamsport, Pa.

Application March 25, 1954, Serial No. 418,672

1 Claim. (Cl. 82—41)

This invention relates to an adjustable pinch dog and more particularly to a universal lathe dog.

An object of this invention is to provide an adjustable pinch dog in which the work may be inserted and tightened and which by its engagement in the machine maintains the work in adjusted position.

Another object of this invention is to provide an adjustable pinch dog in which work may be inserted and which when tightened on the work will not deform the same.

A further object of this invention is to provide an adjustable pinch dog which will accommodate work of various sizes and shapes.

A yet further object of this invention is to provide an adjustable pinch dog which is simple and efficient in construction, and durable and lasting in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
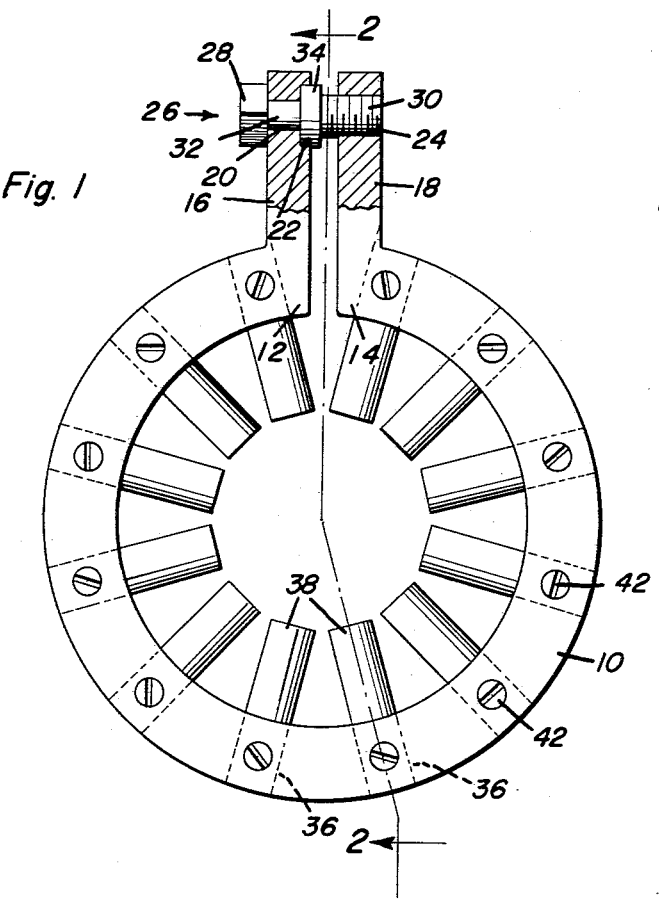
Figure 1 is a side elevational view of the adjustable pinch dog forming the subject of this invention with parts broken away.
Figure 2:
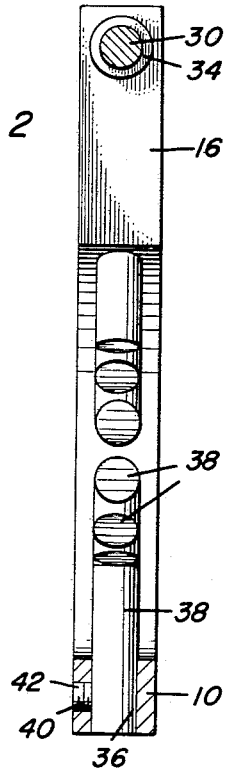
Figure 2 is a sectional view taken substantially along section line 2—2 of Figure 1.

Referring now more particularly to the accompanying drawing it will be seen that the improved adjustable pinch dog forming the subject of this invention includes, a split ring 10 having spaced apart free end portions 12 and 14. Secured to each of the free ends 12 and 14 and extending substantially radially outwardly therefrom are a pair of projections 16 and 18.

The projection 16 is provided with an aperture 20 extending therethrough in a direction substantially tangent to the split ring 10. A counterbore 22 is formed in the projection 16 on the side thereof facing the projection 18. The projection 18 is provided with an internally threaded aperture 24 extending therethrough which is in alignment with the aperture 20 and counterbore 22. A bolt 26 is provided with an enlarged head 28 at one end and an externally threaded portion 30 at its other end. The portion of the bolt 26 between the head 28 and the threaded portion 30 is reduced as at 32. The reduced portion 32 is received in the aperture 20 and the threaded portion 30 is adapted to be threadedly engaged in the threaded aperture 24. A collar 34 is adapted to be received on the reduced portion 32 in abutting relation to the enlarged threaded portion 30. The collar 34 is partially received within the counterbore 22. Thus, it will be seen that when the bolt is inserted in position and rotated the projection 18 will be urged toward the projection 16. When the bolt 26 is rotated in the opposite direction the projection 18 will be urged away from the projection 16.

The split ring 10 is provided with a plurality of radially extending apertures 36. A pin member 38 is inserted through each of the apertures 38 for sliding movement within the apertures 36. In order to retain the pins 38 in adjusted position the split ring 10 is provided with a plurality of internally threaded apertures 40 which extend parallel to the central axis of the split ring 10. The threaded apertures 40 intersect the radial extending apertures 36. A suitable set-screw 42 is mounted within each of the internally threaded apertures 40 and engages the pins 38 for retaining the same in radially adjusted positions.

In practical use of this device, the pins 38 are inserted in the split ring 10 and the bolt 26 is loosened so that the projection 18 is spaced from the projection 16. Then, the work is inserted between the inner ends of the pins and the pins are forced inwardly to engage the work. The set-screws 42 are then tightened to retain the pins in adjusted position. Then, the bolt 26 can be tightened whereby the pins 38 will more positively grip the work placed therebetween. The pressure exerted by the pins 38 will be equal on all points of the work. When transferring the dog from one piece of work to another all that is necessary is that the bolt 26 be loosened whereby the pins 38 will be moved out of engagement with the work and the work can be easily removed and then the dog placed on a new piece of work.

Figure 3:
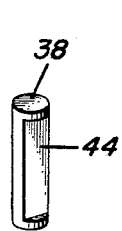
Figure 3 is one form of pin which can be used with the adjustable pinch dog forming the subject of this invention.

As seen in Figures 3 through 7, various types of pins are provided for use with the adjustable pinch dog to accommodate any type or shape of work. As seen in Figure 3, the pin 38 is merely provided with a longitudinally extending flattened portion 44 upon which portion the set-screw 42 will bear. With this modification, when the set-screw 42 is loosened the pin 38 will not fall from the dog inasmuch as the shoulders formed at the end of the pin will engage the set-screw.

Figure 4:
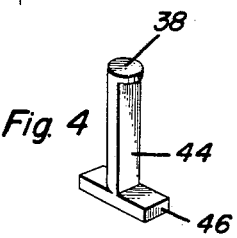
Figure 4 is another form of pin which can be used with the adjustable pinch dog.

In Figure 4 there is shown a pin 38 having the flattened portion 44 and wherein the shoulder at one end is enlarged as at 46 to provide a greater bearing surface on the work.

Figure 5:
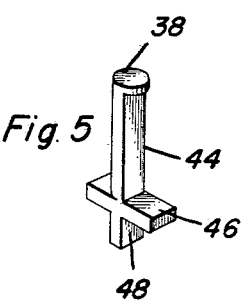
Figure 5 is a further form of pin which can be used with the adjustable pinch dog.

Figure 5 shows a pin similar to Figure 4 wherein the enlarged shoulder 46 is provided with a projection 48 extending from the face thereof opposite the pin 38 and which projection 48 will provide a line point contact with the work.

Figure 6:
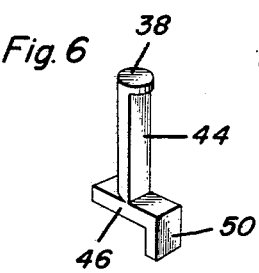
Figure 6 is still another form of pin which can be used with the adjustable pinch dog.

The pin 38 shown in Figure 6 is also provided with the flattened portion 44 and the enlarged shoulder 46 but is provided with a projection 50 at one end of the shoulder 46. This shoulder 46 and projection 50 provides an offset means whereby work having a small shaft can be more easily gripped in a line point contact.

Figure 7:
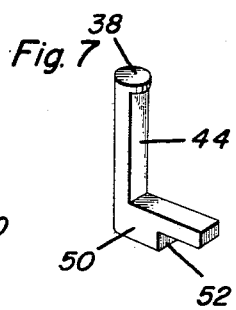
Figure 7 is a yet further form of pin which can be used with the adjustable pinch dog.

The pin 38 shown in Figure 7 is also provided with the flattened portion 44 and is further provided with a shoulder 52 extending from one side of one end thereof. The shoulder 52 is provided with a cut-out portion 54 at its free end whereby work can be mounted on the dog in offset relation and will be engaged by a large bearing surface. Further the ledge of the cut-out portion 54 will prevent movement of the work toward the dog.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

An adjustable pinch dog comprising a split ring having spaced apart free end portions, each of said free end portions being provided with a projection extending outwardly therefrom in a substantially radial direction, means interconnecting said projections for urging the same together, a plurality of pin members mounted on said ring for radial sliding movement and means on said ring for retaining said pin members in radially adjusted positions, said ring being provided with a plurality of radially extending apertures therein, said pin members being slidably received in said apertures, said last-named means comprising a plurality of set-screws mounted on said ring for movement transverse to said apertures, one of said set-screws intersecting each of said apertures for engaging said pin members for retaining the same in adjusted position.

References Cited in the file of this patent

UNITED STATES PATENTS

| | | |
|---|---|---|
| 189,953 | Niebell | Apr. 24, 1877 |
| 515,391 | Willis | Feb. 27, 1894 |
| 1,495,451 | Starke | May 27, 1924 |
| 2,407,908 | Ventres | Sept. 17, 1946 |